(12) United States Patent
Arase

(10) Patent No.: US 6,912,722 B2
(45) Date of Patent: Jun. 28, 2005

(54) DISK DRIVE AND BEAM ANGLE ADJUSTING STRUCTURE

(75) Inventor: Hiroyuki Arase, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 157 days.

(21) Appl. No.: 10/622,608

(22) Filed: Jul. 18, 2003

(65) Prior Publication Data

US 2004/0017765 A1 Jan. 29, 2004

(30) Foreign Application Priority Data

Jul. 19, 2002 (JP) ........................................ 2002-210866

(51) Int. Cl.$^7$ ........................... G11B 7/08; G11B 7/085; G11B 7/09
(52) U.S. Cl. ...................................................... 720/674
(58) Field of Search ................................ 720/674, 658, 720/659, 672, 675, 676, 681; 369/263.1

(56) References Cited

U.S. PATENT DOCUMENTS 4,340,919 A * 7/1982 Kato ....................... 360/291.2

6,493,309 B2 * 12/2002 Sogawa et al. ............. 720/674

FOREIGN PATENT DOCUMENTS

JP 2002-15433 1/2002

OTHER PUBLICATIONS

Patent Abstracts of Japan, Publication No. 2002015433 A, Dated: Jan. 18, 2002, 1 page.

* cited by examiner

*Primary Examiner*—Julie Anne Watko
(74) *Attorney, Agent, or Firm*—Osha · Liang LLP

(57) ABSTRACT

An optical pickup angle adjusting mechanism of a beam angle adjusting structure consists of an external screw member and an internal screw part, while the external screw member is formed by integrating a flange engaging part engaging with a chassis to hold the edge of the chassis with two flanges, an external screw portion and a cylindrical press-fit part located between the flange engaging part and the external screw portion and the internal screw part includes a nut fixed to a pickup support part and a press-fit hole formed in the pickup support part coaxially with the nut for receiving the press-fit part in a close contact manner. Thus, a disk drive and a beam angle adjusting structure preventing adjusting screws from jolts can be obtained without increasing the number of components.

6 Claims, 7 Drawing Sheets

DISK DRIVE AND BEAM ANGLE ADJUSTING STRUCTURE

BACKGROUND OF THE INVENTION

1. Field of the Invention

The present invention relates to a disk drive and a beam angle adjusting structure, and more specifically, it relates to a disk drive and a beam angle adjusting structure preventing a non-smooth motion resulting from employment of screws for adjusting the entrance angle of a light beam applied to a disk.

2. Description of the Background Art

A disk drive for a compact disk (CD) or a mini disk (MD) has a beam angle adjusting mechanism adjusting a beam emitted from an optical pickup for applying the same to the surface of the disk at a prescribed angle (90° in general). A recent disk subjected to high-density recording has a bit interval narrowly set in the radial direction. In order to read a signal recorded in high density, the numerical aperture (NA) of an objective lens set on a beam outgoing position is increased for reducing the beam diameter. It is known that comatic aberration results in proportion to the cube of the numerical aperture and the thickness of the disk if the optical axis of a laser beam is even slightly inclined with respect to a signal surface of the disk. This comatic aberration distorts the waveform of a reproduced signal and causes factors for voltage fluctuation, instability of the mechanism and the like. Therefore, the beam angle adjusting mechanism is provided on a chassis for adjusting the inclination of the optical axis of the laser beam. The system of this beam angle adjusting mechanism varies with the maker or the type of the mechanism. In relation to an optical pickup sliding in the radial direction of the disk along a guide shaft, for example, the following systems are known, for example:

(a1) A single guide shaft is employed for adjusting inclination along the guide shaft (along the radial direction of the disk) by changing inclination of a turntable while adjusting inclination in a direction intersecting with the guide shaft (intersecting with the radial direction) by an angular position of the optical pickup, rotatably and movably engaging with the guide shaft, about the guide shaft.

(a2) Two guide shafts are provided for varying heights for fixing ends of the guide shafts on both ends of the two guide shafts, i.e., on four portions, and changing the angle of the optical pickup thereby adjusting the entrance angle of the light beam upon the disk.

There are many other adjusting systems in addition to the above. The beam angle adjusting mechanism having any of these systems is assembled into the disk drive in situ in a step of manufacturing the disk drive and set to a proper beam angle.

FIG. 8 illustrates a beam angle adjusting mechanism according to the aforementioned system (a2). Referring to FIG. 8, an optical pickup 102 comprising an objective lens 122 defining a beam outlet on its upper surface is guided by two guide shafts 104 to radially move along a disk 107 placed on a turntable 103. Both ends of the two guide shafts 104 are held between brackets 109 fixed to a chassis 101 with set screws 150 and supported by bolts 106 from under the chassis 101, to be adjusted in inclination. The guide shafts 104 are urged by springs 140 to approach the chassis 101, while the bolts 106 arranged under the brackets 109 adjust the height for holding the guide shafts 104. This holding height is so adjusted on four portions that inclination of the optical pickup 102 can be adjusted along the radial direction of the disk 107 and the direction intersecting therewith. Consequently, the beam angle adjusting mechanism can control the beam emitted from the optical pickup 102 to ensure a state perpendicular to the surface of the disk 107.

As shown in FIG. 9, each bolt 106 is fitted with an internal screw 110 provided on the chassis 101 for adjusting the holding height. A clearance S for thread engagement is necessarily provided between the threads of the bolt (external screw) 106 and the internal screw 110. After the bolt 106 is screwed into the internal screw 110 with a tool and adjusted when the beam angle adjusting mechanism is assembled into a disk drive, therefore, jolts may be formed between the external screw 106 and the internal screw 110 due to an impact caused when the optical pickup 102 slides along the guide shafts 104 or falls on the floor immediately after removal of a torque from the tool or after the adjustment. Such jolts result in inclination of the external screw 106 and fluctuation of the height for holding each guide shaft 104, as shown in FIG. 10. This fluctuation of the holding height immediately results in angle fluctuation of the laser beam, to bring the aforementioned voltage fluctuation and instability.

In order to sole the aforementioned problem, a spring section 108 may be provided in each bracket 109 fixed to the chassis 101 for unidirectionally applying urging force F to the external screw 106 thereby preventing jolts between the external screw 106 and the internal screw 110. The spring section 108 has a smooth pressing surface facing the external screw 106 to be in contact with a plurality of crests of the external screw 106. The external screw 106 and the internal screw 110 can be prevented from jolts due to this spring section 108, for sustaining the effect of adjustment.

When the spring section 108 is employed in the aforementioned manner, however, the number of components is naturally increased while the man-hour for arranging the spring section 108 in each bracket 109 in a prescribed posture is also increased. Therefore, development of a structure preventing screws for adjustment from jolts without increasing the number of components such as spring sections has been awaited.

SUMMARY OF THE INVENTION

An object of the present invention is to provide a disk drive and a beam angle adjusting structure preventing adjusting screws from a non-smooth motion without increasing the number of components.

The disk drive according to the present invention comprises a turntable mounted on a chassis for receiving and rotating a disk, a guide shaft fixed to the chassis, an optical pickup rotatably mounted on the guide shaft for moving along the guide shaft and a beam angle adjusting mechanism so provided as to apply a light beam emitted from the optical pickup to the surface of the disk at a prescribed angle. The beam angle adjusting mechanism consists of a turntable angle adjusting mechanism mounted on the turntable for adjusting inclination of the disk in a direction along the guide shaft and an optical pickup angle adjusting mechanism mounted on the optical pickup for adjusting the angular position of the optical pickup around the guide shaft thereby adjusting the angle of the light beam in a plane intersecting with the guide shaft. The optical pickup angle adjusting mechanism consists of an external screw member and an internal screw part. The external screw member is formed by integrating a flange engaging part engaging with the chassis for holding the edge of the chassis with two flanges to be located on a reference height position based on the chassis, an external screw portion and a cylindrical press-fit part located between the flange engaging part and the external screw portion. The internal screw part includes a nut fixed to a pickup support part partially forming the optical pickup and a press-fit hole formed in the pickup support part coaxially with the nut for receiving the press-fit part in a close contact manner. The flange engaging part of the external screw member is engaged with the edge of the chassis, the external screw portion is fitted with the nut and the press-fit part is press-fitted into the press-fit hole thereby adjusting the distance between the chassis and the internal screw part.

According to this structure, molding accuracy for the cylindrical press-fit part and the press-fit hole can be by far accurately and readily attained as compared with the screw parts. Therefore, the cylindrical press-fit part can be press-fitted into the circular press-fit hole to be in close contact therewith without remarkably increasing the manufacturing cost. The screw parts can be prevented from jolts due to such close press fitting. The aforementioned external screw member may have an integrated thumb part.

This external screw member is fitted with the internal screw part to co-slide when the optical pickup slides along the guide shaft. The flange engaging part and the chassis, engaging with each other so that the chassis defines the reference height position in the aforementioned adjustment, are merely smoothly in contact with each other after completion of the adjustment. Therefore, the external screw member co-slides while gliding the flange engaging part on the chassis in the aforementioned sliding of the optical pickup.

According to another aspect of the present invention, the external screw member of the optical pickup angle adjusting mechanism is formed by integrating a flange engaging part engaging with the chassis for holding the edge of the chassis with two flanges to be located on a reference height position based on the chassis and an external screw portion having an elliptic section. The internal screw part consists of a nut having a circular section fixed to a pickup support part partially forming the optical pickup while the diameter of the circular section is smaller than the major axis of the elliptic section of the external screw portion. The flange engaging part of the external screw member is engaged with the edge of the chassis and the external screw portion is fitted with the nut having the circular section thereby adjusting the distance between the chassis and the internal screw part.

According to this structure, the external screw portion having the major axis larger than the diameter of the circular section of the internal screw part is elastically screwed into the internal screw part in adjustment of the beam angle. Therefore, the thread faces of the internal screw part and the major axis part of the external screw portion apply strong contact pressures to each other. Thus, a fitting structure causing no jolts by a slight impact can be obtained. The aforementioned external screw member, having an untapered forward end in general, may be tapered or incompletely threaded.

A case of the aforementioned optical pickup may be integrated with the nut by integral injection molding.

According to this structure, dispersion in press fitting can be prevented when the nut (internal screw part) is embedded in the support part of the optical pickup injection-molded from resin for improving the positional accuracy of the internal screw part. The aforementioned integral nut may be prepared by insert molding, i.e., by previously embedding a metal or resin nut and injection-molding the same. Alternatively, a metal nut may be press-fitted into the support part of resin later. Further alternatively, a mold for the internal screw part may be formed in the stage of a die for injecting resin into the mold and detaching the aforementioned case from the mold with disengagement along screw threads.

The beam angle adjusting structure according to the present invention is arranged on at least either a turntable or an optical pickup for adjusting a light beam emitted from the optical pickup to be applied to the surface of a disk at a prescribed angle. This beam angle adjusting structure consists of an external screw member and an internal screw part. The external screw member has a reference position engaging part located on a reference height position based on a chassis for engaging with the chassis, a cylindrical press-fit part and an external screw portion. The internal screw part has an internal screw portion integrated with the optical pickup and a press-fit hole receiving the press-fit part.

According to the aforementioned structure, screws employed in the beam angle adjusting structure can be readily prevented from jolts. The reference position engaging part is not restricted to two flanges but may alternatively have any shape so far as the same can adjust the distance between the chassis and the internal screw part by engaging with the chassis on the reference position based on the chassis. The aforementioned external screw member and the internal screw part may be provided on either the optical pickup or the turntable.

Another beam angle adjusting structure according to the present invention consists of an external screw member and an internal screw part. The external screw member has a reference position engaging part located on a reference height position based on a chassis for engaging with the chassis and an external screw portion having an elliptic section. The internal screw part has an internal screw portion integrated with an optical pickup with a circular section having a diameter smaller than the major axis of the elliptic section of the external screw portion.

Also according to the aforementioned structure, screws can be inhibited from jolts without increasing the number of components.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

Figure 1:
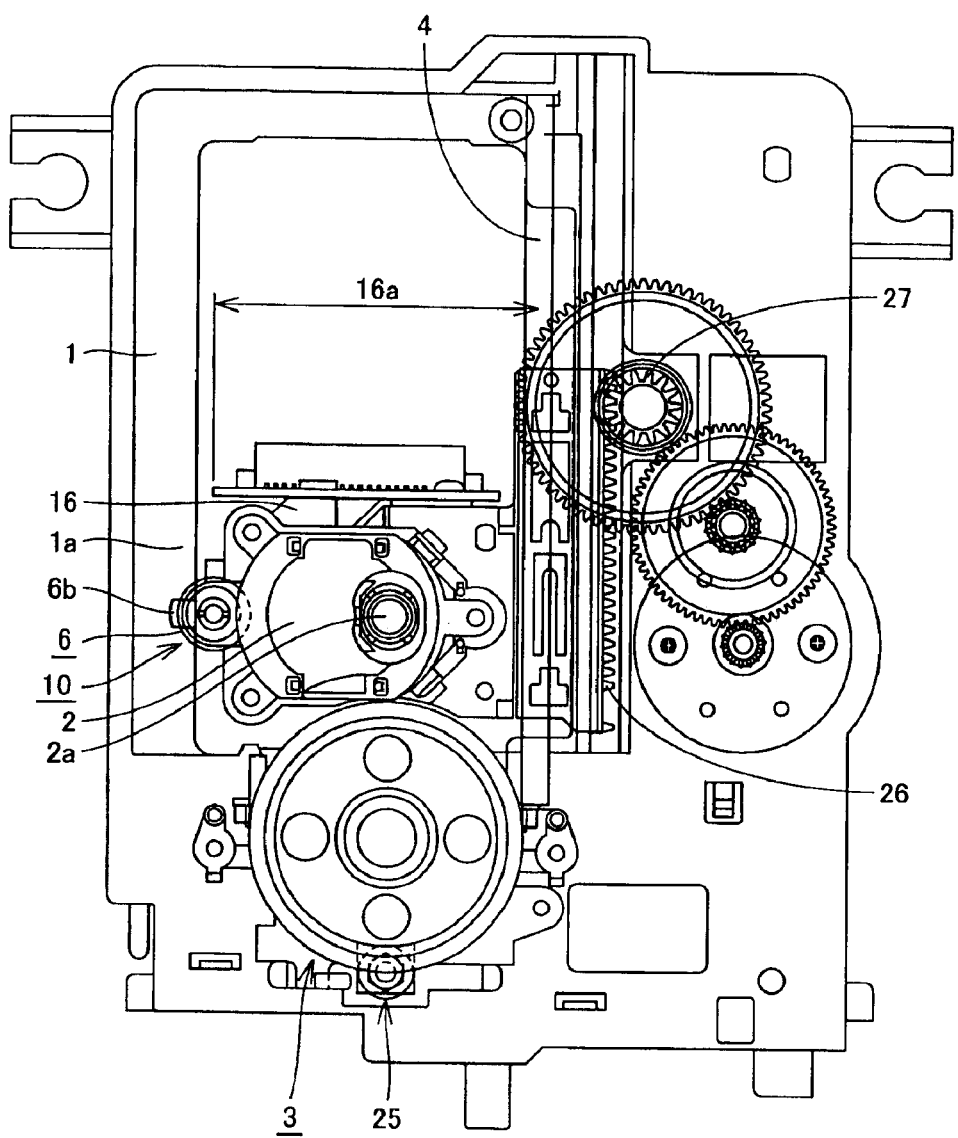
FIG. 1 is a plan view showing a disk drive according to a first embodiment of the present invention.

FIG. 1 is a plan view showing a disk drive according to a first embodiment of the present invention. In this disk drive, a single guide shaft 4 passes through a through-hole formed in a pickup support part 16 supporting an optical pickup 2. The pickup support part 16, integrated and coupled with the optical pickup 2, can be regarded as a member partially forming the optical pickup 2. This pickup support part 16 is rotatably mounted around the guide shaft 4, and slides along the guide shaft 4. In other words, the optical pickup 2 is rotatably mounted around the guide shaft 4 and slides along the guide shaft 4. A rack 26 and a pinion 27 drive the aforementioned sliding of the optical pickup 2. A disk (not shown) is placed on a turntable 3. A laser beam passes through an objective lens 2a defining an outlet of the optical pickup 2, to be incident upon the disk located above the objective lens 2a.

A beam angle adjusting mechanism is formed by a turntable angle adjusting mechanism 25 adjusting radial inclination of the disk on the turntable 3 and an optical pickup angle adjusting mechanism 10 adjusting inclination in a direction intersecting with the radial direction of the disk. The beam angle adjusting mechanism according to the present invention slightly requiring an excess space is mainly applied to an optical pickup having space allowance, while the same may be applied to a turntable angle adjusting mechanism.

The optical pickup angle adjusting mechanism 10 is formed by an external screw member 6 having a flange engaging part 6b engaging with an edge 1a of a chassis 1 and an internal screw part 15 provided on the pickup support part 16. The external screw member 6 is located on a reference height position based on the edge 1a of the chassis 1, so that the height position of the external screw member 6 itself remains unchanged but the internal screw part 15 changes its height position when the external screw member 6 is fitted with the internal screw part 15. Therefore, the pickup support part 16 varies its height position with fluctuation of the height position of the external screw member 6. This pickup support part 16 serves as an arm having a length 16a fulcruming the guide shaft 4.

Figure 2:
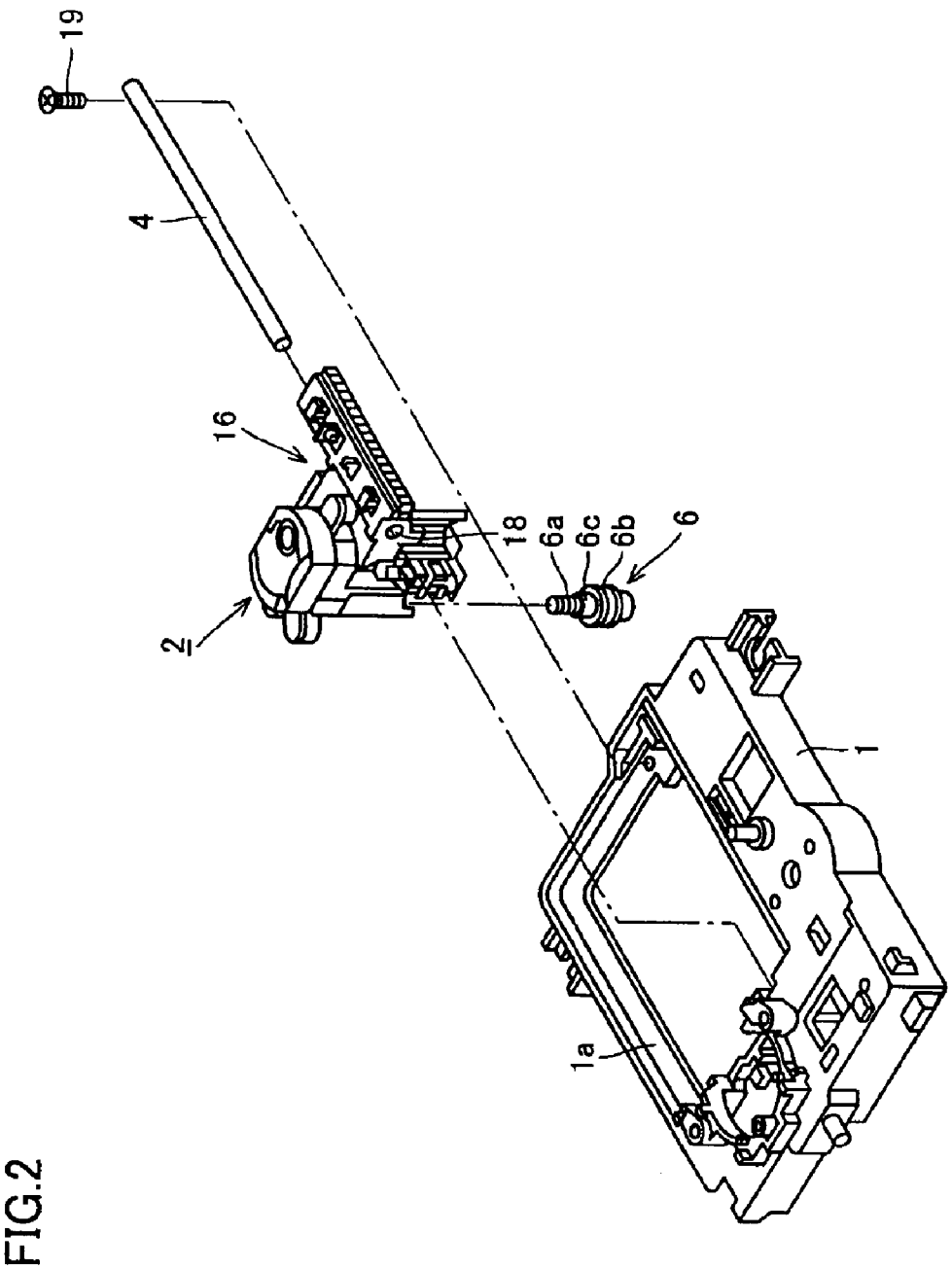
FIG. 2 is an exploded perspective view selectively showing components related to an optical pickup in the disk drive shown in FIG. 1.

FIG. 2 is an exploded perspective view of the disk drive according to this embodiment selectively showing the portion around the optical pickup 2. The guide shaft 4 is fixed to the chassis 1 with a bolt 19 or the like. The guide shaft 4 passes through a hole 18 formed in the pickup support part 16. The flange engaging part 6b of the external screw member 6 fitted with the internal screw part (nut) 15 provided on the pickup support part 16 is engaged with the edge 1a of the chassis 1 for keeping the external screw member 6 at a constant height position. The external screw member 6 is so press-fitted that an external screw part 6a is fitted with the nut 15 fixed to the pickup support part 16 and a cylindrical press-fit part 6c is in close contact with a press-fit hole 15c provided in the internal screw part 15. The cylindrical press-fit part 6c and the press-fit hole 15c can be worked in by far higher positional accuracy as compared with the screw parts 6a and 15.

Figures 3A, 3B:
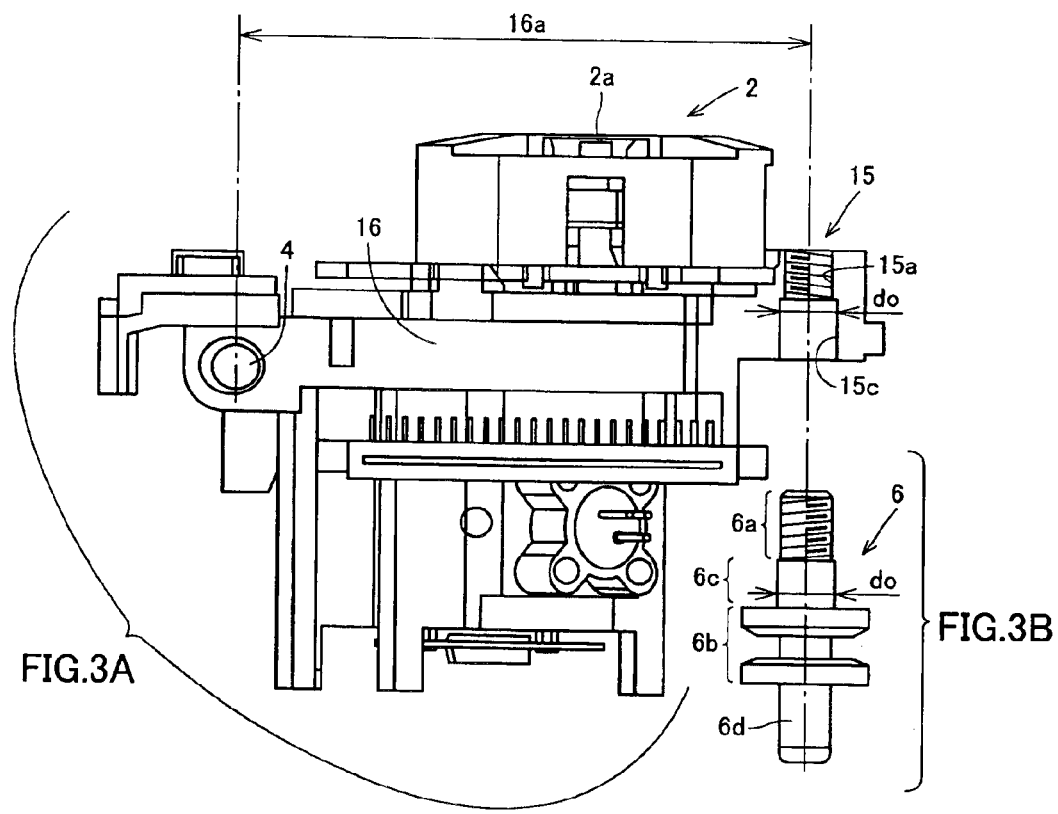
FIG. 3A illustrates an internal screw part provided on a pickup support part of the disk drive shown in FIG. 1.
FIG. 3B illustrates an external screw member.

FIGS. 3A and 3B illustrate the optical pickup angle adjusting mechanism 10. FIG. 3A illustrates the pickup support part 16 provided with the internal screw part 15 and the optical pickup 2, and FIG. 3B illustrates the external screw member 6. The pickup support part 16 can rotate about the guide shaft 4 while carrying the optical pickup 2 thereon. A metal nut 15a is embedded in the internal screw part 15, and the press-fit hole 15c having a diameter larger than the inner diameter of the nut 15a is provided under the same. The nut 15a may alternatively be made of resin. The internal screw part 15 rotates about the guide shaft 4 integrally with the optical pickup 2 and the pickup support part 16.

Figure 4:
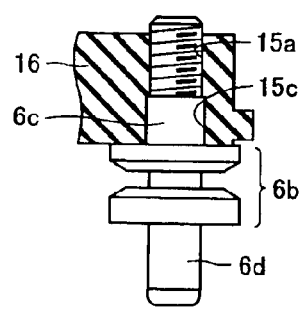
FIG. 4 illustrates the external screw member shown in FIG. 3B screwed and press-fitted into the internal screw part shown in FIG. 3A.

The external screw member 6 is formed by the screw part 6a fitted with the nut 15a, the cylindrical press-fit part 6c press-fitted into the press-fit hole 15c, the flange engaging part 6b holding the edge 1a of the chassis 1 between two flanges to be located on the reference height position based on the edge 1a and an adjusting knob 6d. The press-fit hole 15c and the cylindrical press-fit part 6c have the same diameter do. FIG. 4 illustrates the external screw member 6 fitted with the internal screw part 15 so that the press-fit part 6c is press-fitted into the press-fit hole 15c. The internal screw part 15 can be formed by a nut of a metal or resin. In other words, the nut of a metal or resin may be previously arranged in a die for injection molding for injection-molding resin into the same. Alternatively, the internal screw part 15 may be integrally molded with the pickup support part 16 in injection molding of resin in place of the nut employed as a separate member. In other words, a screw may be formed in a die to constitute an internal screw. The product can be rotatively disengaged and taken out from the mold. The aforementioned press-fit part 6c has no allowance for play or jolts. Even if the external screw part 6a or the internal screw part 15 causes play or jolts, therefore, the press-fit part 6c can eliminate motion of the play or jolts.

Figure 5:
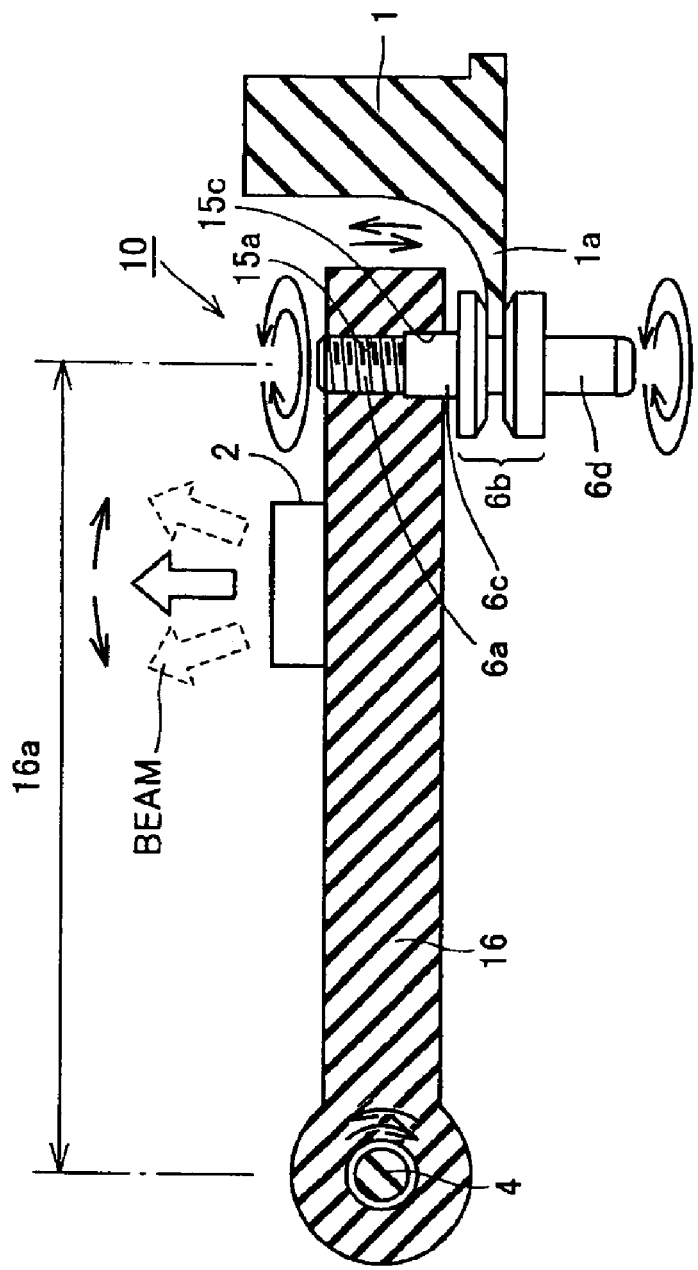
FIG. 5 illustrates a principle of beam angle adjustment in the first embodiment of the present invention.

FIG. 5 is a diagram for illustrating the aforementioned optical pickup angle adjusting mechanism 10 adjusting a beam angle. The pickup support part 16 is rotatable around the guide shaft 4. The edge 1a of the chassis 1 is held by the flange engaging part 6b of the external screw member 6 to retain the external screw member 6 at a prescribed height. The edge 1a of the chassis 1 provides the reference height position. When the knob 6d of the external screw member 6 is nipped and turned, the external screw member 6 vertically moves the nut 15a without moving itself due to the engagement with the chassis 1. In other words, the external screw member 6 can vary the distance between the internal screw part 15 and the chassis 1. Thus, the external screw member 6 changes the angular position of the pickup support part 16 by changing the height of the nut 15a. Therefore, inclination of the pickup support part 16 is fluctuated to adjust the angle of a laser beam.

The external screw member 6 fitted with the internal screw part 15 co-slides when the optical pickup 2 slides along the guide shaft 4. The flange engaging part 6b, engaged with the chassis 1 to be located on the reference height position based on the chassis 1 in the aforementioned adjustment, is merely smoothly in contact with the chassis 1 after the adjustment. Therefore, the external screw member 6 co-slides with the optical pickup 2 while gliding the flange engaging part 6b on the edge 1a of the chassis 1.

As hereinabove described, the press-fit part 6c has no allowance for play or jolts. Therefore, motion of the play or jolts can be eliminated with the simple mechanism of the press-fit part 6c without increasing the number of components.

(Second Embodiment)

Figure 6:
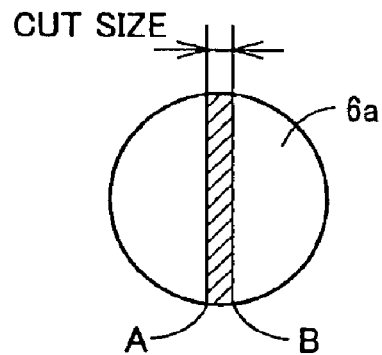
FIG. 6 illustrates the characteristic of an external screw member in a beam angle adjusting structure according to a second embodiment of the present invention.
Figure 7A:
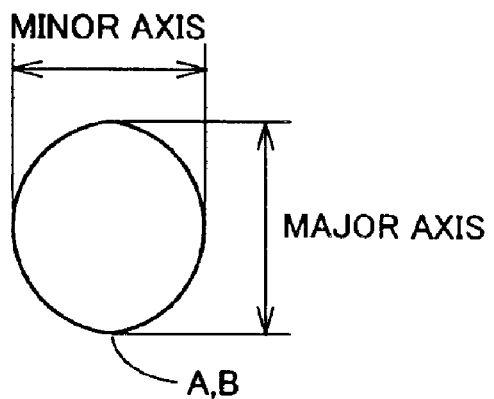
FIG. 7A is a sectional view of an external screw portion in the beam angle adjusting structure according to the second embodiment of the present invention.
Figure 7B:
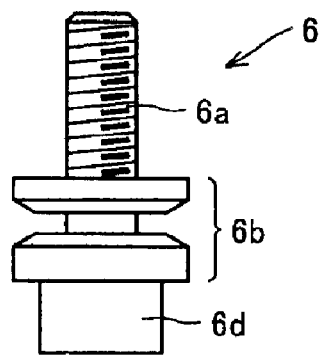
FIG. 7B illustrates the external screw member.
Figure 8:
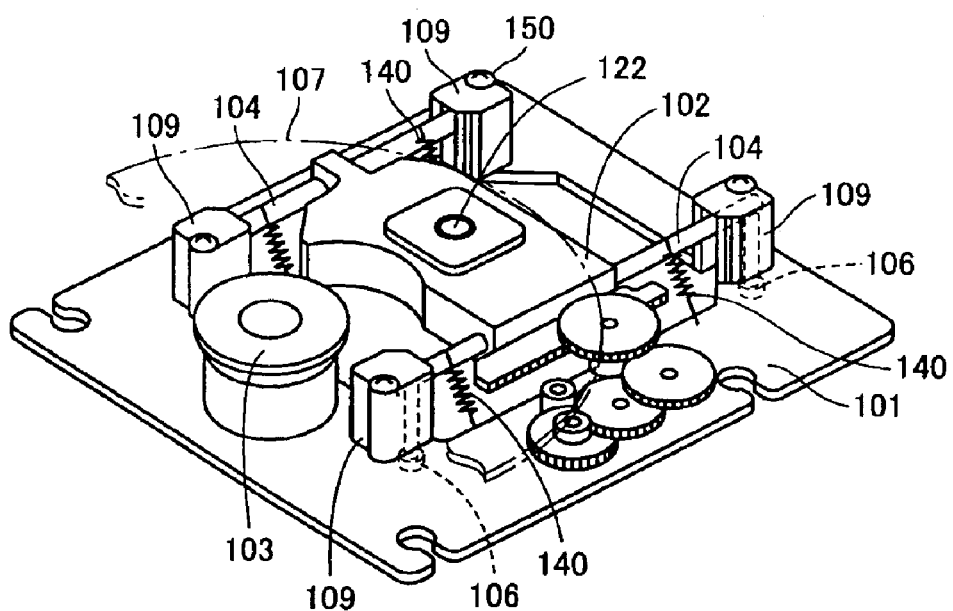
FIG. 8 illustrates a conventional disk drive.
Figure 9:
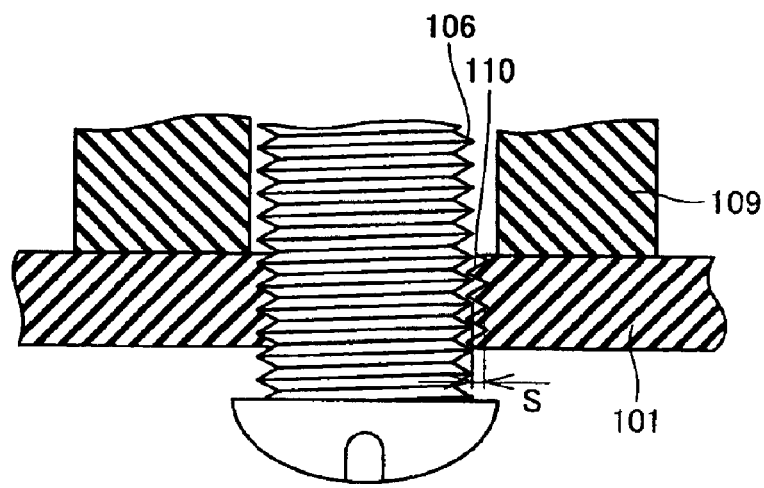
FIG. 9 illustrates a bolt fitted with an internal screw part of a chassis in the disk drive shown in FIG. 8.
Figure 10:
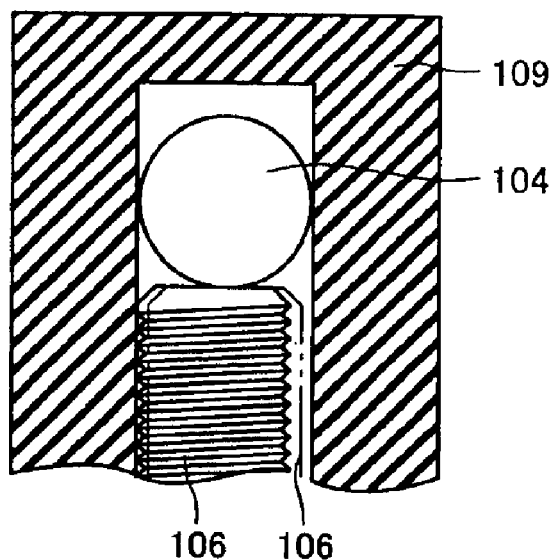
FIG. 10 illustrates jolts of the bolt.
Figure 11:
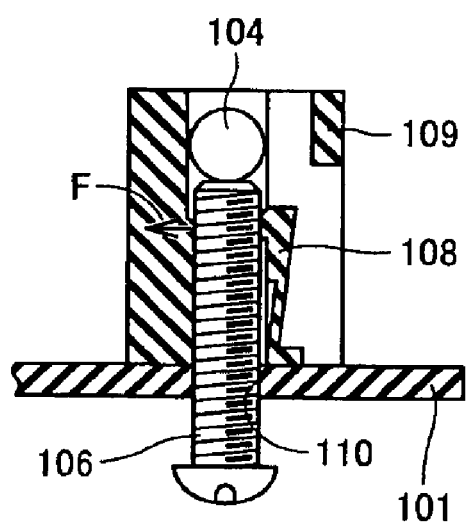
FIG. 11 illustrates a structure obtained by arranging a spring section in a bracket for preventing the bolt from jolts in the conventional disk drive.

FIG. 6 illustrates the characteristic of an external screw member in a beam angle adjusting structure according to a second embodiment of the present invention. Referring to FIG. 6, the central portion of a section of a circular external screw is deleted by a prescribed width, and separated portions are bonded to each other. Consequently, an external screw part 6a having an elongated section is formed with a minor axis shorter by the deleted width and a major axis corresponding to the diameter of the original circle, as shown in FIG. 7A. A nut of an internal screw part (not shown) provided on a pickup support part (not shown) can be rendered shorter than the aforementioned major axis, and identical to the aforementioned minor axis in particular. FIG. 7B illustrates an external screw member 6 formed according to the aforementioned idea. This external screw member 6 may be provided with no press-fit part (boss). When the external screw part 6a of the external screw member 6 is fitted with the nut of the internal screw part, the portion having the major axis is screwed into the internal screw part with elastic deformation. Therefore, thread faces of the major axis portion of the external screw part 6a and the internal screw part apply strong contact pressures to each other. Thus, it is possible to obtain a fitting structure causing no jolts with a slight impact.

According to the aforementioned beam angle adjusting structure, jolts or play can be removed from the screw parts assembled into the adjusting structure without increasing the number of components.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk drive comprising a turntable mounted on a chassis for receiving and rotating a disk, a guide shaft fixed to said chassis, an optical pickup rotatably mounted on said guide shaft for moving along said guide shaft and a beam angle adjusting mechanism so provided as to apply a light beam emitted from said optical pickup to the surface of said disk at a prescribed angle, wherein said beam angle adjusting mechanism consists of a turntable angle adjusting mechanism mounted on said turntable for adjusting inclination of said disk in a direction along said guide shaft and an optical pickup angle adjusting mechanism mounted on said optical pickup for adjusting the angular position of said optical pickup around said guide shaft thereby adjusting the angle of said light beam in a plane intersecting with said guide shaft, said optical pickup angle adjusting mechanism consists of an external screw member and an internal screw part, said external screw member is formed by integrating a flange engaging part engaging with said chassis for holding the edge of said chassis with two flanges to be located on a reference height position based on said chassis, an external screw portion and a cylindrical press-fit part located between said flange engaging part and said external screw portion, and said internal screw part includes a nut fixed to a pickup support part partially forming said optical pickup and a press-fit hole formed in said pickup support part coaxially with said nut for receiving said press-fit part in a close contact manner, for engaging said flange engaging part of said external screw member with the edge of said chassis, fitting said external screw portion with said nut and press-fitting said press-fit part into said press-fit hole thereby adjusting the distance between said chassis and said internal screw part.

2. The disk drive according to claim 1, wherein
said nut and said pickup support part are integrated with each other by integral injection molding.

3. A disk drive comprising a turntable mounted on a chassis for receiving and rotating a disk, a guide shaft fixed to said chassis, an optical pickup rotatably mounted on said guide shaft for moving along said guide shaft and a beam angle adjusting mechanism so provided as to apply a light beam emitted from said optical pickup to the surface of said disk at a prescribed angle, wherein said beam angle adjusting mechanism consists of a turntable angle adjusting mechanism mounted on said turntable for adjusting the angle of said disk in a direction along said guide shaft and an optical pickup angle adjusting mechanism mounted on said optical pickup for adjusting the angular position of said optical pickup around said guide shaft thereby adjusting the angle of said light beam in a plane intersecting with said guide shaft, said optical pickup angle adjusting mechanism consists of an external screw member and an internal screw part, said external screw member is formed by integrating a flange engaging part engaging with said chassis for holding the edge of said chassis with two flanges to be located on a reference height position based on said chassis and an external screw portion having an elliptic section, and said internal screw part consists of a nut having a circular section fixed to a pickup support part partially forming said optical pickup while the diameter of said circular section is smaller than the major axis of said elliptic section of said external screw portion, for engaging said flange engaging part of said external screw member with the edge of said chassis and fitting said external screw portion with said nut having said circular section thereby adjusting the distance between said chassis and said internal screw part.

4. The disk drive according to claim 2, wherein
said nut and said pickup support part are integrated with each other by integral injection molding.

5. A beam angle adjusting structure arranged in a disk drive comprising a turntable mounted on a chassis for receiving and rotating a disk, a guide shaft fixed to said chassis and an optical pickup rotatably engaging with said guide shaft for moving along said guide shaft on at least either said turntable or said optical pickup for adjusting a light beam emitted from said optical pickup to be applied to the surface of said disk at a prescribed angle, said beam angle adjusting structure consisting of an external screw member and an internal screw part, wherein said external screw member has a reference position engaging part located on a reference height position based on said chassis for engaging with said chassis, a cylindrical press-fit part and an external screw portion, and said internal screw part has an internal screw portion integrated with said optical pickup and a press-fit hole receiving said press-fit part.

6. A beam angle adjusting structure arranged in a disk drive comprising a turntable mounted on a chassis for receiving and rotating a disk, a guide shaft fixed to said chassis and an optical pickup rotatably engaging with said guide shaft for moving along said guide shaft on at least either said turntable or said optical pickup for adjusting a light beam emitted from said optical pickup to be applied to the surface of said disk at a prescribed angle, said beam angle adjusting structure consisting of an external screw member and an internal screw part, wherein said external screw member has a reference position engaging part located on a reference height position based on said chassis for engaging with said chassis and an external screw portion having an elliptic section, and said internal screw part has an internal screw portion integrated with said optical pickup with a circular section having a diameter smaller than the major axis of said elliptic section of said external screw portion.

* * * * *